May 2, 1950            A. SPORKET            2,505,920
FISHING REEL
Filed Nov. 10, 1945
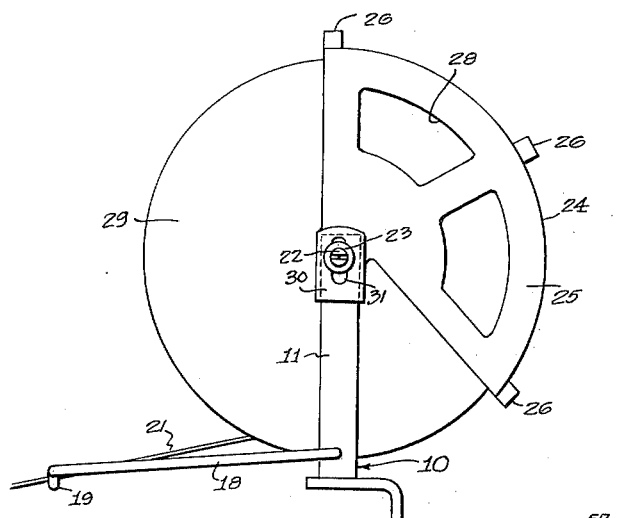
Fig.1.
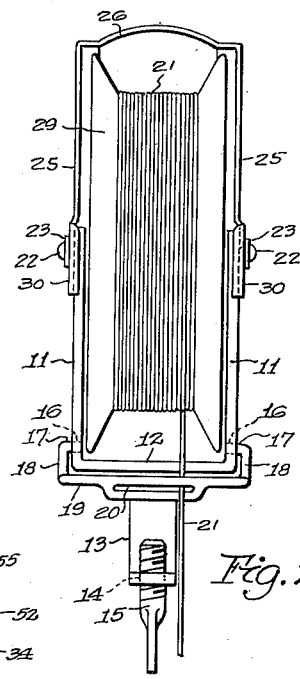
Fig.2.
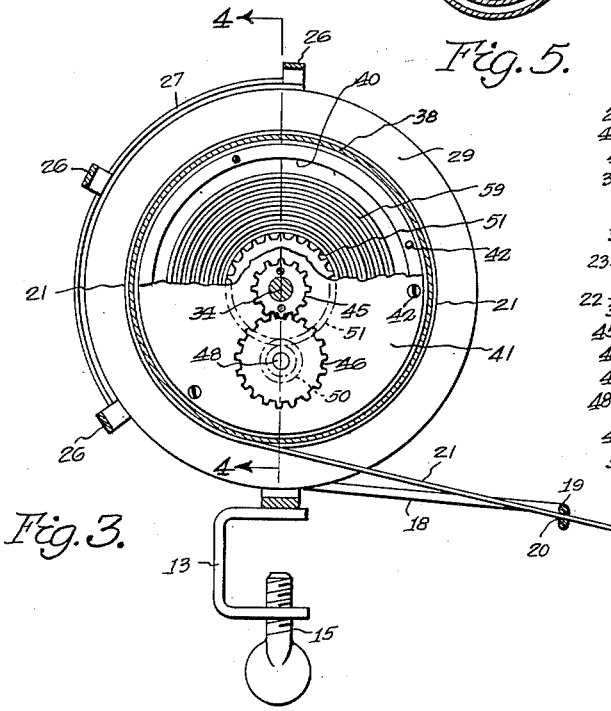
Fig.3.
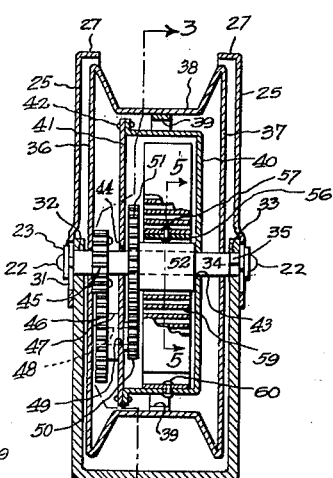
Fig.4.
Fig.5.
Inventor
Albert Sporket
BY Barthel & Bugbee
ATTORNEYS Patented May 2, 1950

2,505,920

UNITED STATES PATENT OFFICE 2,505,920

FISHING REEL

Albert Sporket, Detroit, Mich.

Application November 10, 1945, Serial No. 627,863

2 Claims. (Cl. 242—84.3)

This invention relates to fishing reels, and in particular, to self-winding reels.

One object of this invention is to provide an improved self-winding reel wherein the mechanism is simple and inexpensive to manufacture.

Another object is to provide a self-winding fishing reel wherein a spring is employed for automatically winding the line upon the spool, and is connected to simple and effective gearing for actuating the spool.

Another object is to provide a self-winding fishing reel as set forth in the preceding objects wherein the end of the spring is releasably anchored to a detent device in a hub.

Another object is to provide a self-winding fishing reel as set forth in the preceding objects wherein the end of the spring is provided with a spring catch or pawl operating in a notch in the hub so as to provide releasable engagement therebetween in the event that the spool is accidentally turned the wrong way in winding up the spring, thereby reducing the frequent breakage previously occurring in such reels from this cause.

Another object is to provide a self-winding fishing reel wherein the principal working parts are enclosed within a chamber which is itself within another chamber, so as to reduce the damaging effects of moisture upon these working parts and to keep them properly lubricated by retaining the lubricant efficiently therein.

Other objects and advantages of the invention will become apparent during the course of the following description of the accompanying drawing, wherein:

Figure 1 is a right-hand side elevation of a preferred embodiment of a self-winding fishing reel according to the present invention;

Figure 2 is a front elevation of the fishing reel shown in Figure 1;

Figure 3 is a vertical section along the line 3—3 in Figure 4 with the spool partly broken away to disclose the internal construction and mechanism;

Figure 4 is a cross-section along the line 4—4 in Figure 3; and

Figure 5 is an enlarged detail cross-section through the hub taken along the line 5—5 in Figure 4.

Referring to the drawings in detail, Figures 1 and 2 show a preferred embodiment of the self-winding fishing reel of this invention as including a frame 10 of approximately U-shaped construction having uprights 11 interconnected by a bottom or bridge portion 12 to which a roughly C-shaped clamp 13 is secured, as by welding.

The clamp 13 in the bottom is provided with a threaded bore 14 threadedly receiving a thumb screw 15 for clamping the reel to any suitable object, such as the seat of a boat.

The uprights 11 are drilled as at 16 (Figure 2) to receive the inwardly turned ends 17 of a U-shaped line guide 18 having a bridge portion 19 provided with a slot 20 through which the line 21 passes. The uprights 11 are provided with set screws or other fasteners 22 and washers 23 for securing thereto a guard 24 having sector-shaped side plates 25 interconnected by cross members 26. The latter in turn are interconnected circumferentially by an arcuately flanged edge 27 of the side plates 25. The side plates 25 are provided with cutout portions 28 to reduce the weight thereof and to permit a better view of the spool 29 and line 21 wound thereon. The side plates 25 are connected to the uprights 11 by means of portions 30 of channel cross-section and having elongated slots 31 therein for receiving the screws 22 and permitting adjustment vertically along the uprights 11. The uprights 11 are drilled as at 32 and 33 (Figure 4) to receive the opposite ends of a pintle or shaft 34, the end 35 of which is squared to fit the square hole 33 and prevent rotation. The set screws 22 are threaded into the opposite ends of the pintle or shaft 34.

The spool 29 is provided with disc-shaped sides 36 and 37 and a central portion 38 in the form of an annular trough. Secured to the inside surface of the latter is a ring 39 which spacedly encircles a cup-shaped spring casing 40 provided on one side with a cover plate 41 fastened thereto, as at 42 (Figure 4). The spring casing 40 and cover plate 41 are drilled as at 43 and 44 to receive the pintle or shaft 34 and are secured thereto as by welding at 44.

Secured, as by riveting to the spool side 36 is a pinion 45. The latter is bored for the free passage of the pintle 34 and meshes with a gear 46 having a hub 47 rotatable upon a shaft 48 passing through a hole 49 in the cover plate 41 and carrying a pinion 50 on the opposite end thereof. The pinion 50 meshes with a gear 51 having a hub 52 bored so as to be freely rotatable upon the pintle or shaft 34. The hub 52 is provided with a notch 53 (Figure 5) having an abutment portion 54 and a gradually sloping portion 55 leading thereto. Lying in the notch 53 is an arcuate spring catch or pawl 56 with its end engaging the abutment 54. The spring catch or pawl 56 is riveted or otherwise secured as at 57 to the inner end 58 of a spiral spring 59, the outer end of which is riveted or otherwise secured at a spring anchorage 60 to the spring casing 40 (Fig. 4).

In operation, the user winds up the spring 59 by turning the spool in the direction tending to coil the spring. While holding the spool 29 with the thumb, the operator threads the line through the slot 20 and attaches the end to the spool 29. He then releases the spool, whereupon the spring causes the spool to rotate and wind the line 21 upon the portion 38 thereof. While the line is being thus wound, it is guided by passing through the slot 20 in the line guide 18.

The invention provides a safety arrangement whereby if the operator turns the spool 29 in the wrong direction while attempting to wind up the spring 59 (Figure 5), the spring catch or pawl 56 slips harmlessly out of the notch 53 and clicks past it as the hub 52 is rotated. This avoids the spring breakage which has hitherto frequently occurred when the spring has been anchored by bending over its end and holding it in a slot in the hub 52. In the present invention, when the spool 29 is wound in the proper direction, however, the spring catch or pawl 56 engages the abutment 54 of the notch 53 and permits the spring 59 to be wound up.

In the use of the invention in fishing, the operator attaches a heavy sinker to the end of the line near the usual hook and bait. He then drops the sinker overboard, and, having clamped the reel to a part of the boat, rows the boat away from the point where he dropped the sinker. As the boat leaves the location of the sinker, the line 21 unwinds from the spool 29, winding up the spring 59. The latter constantly tensions the spool 29 to take the slack out of the line and keep it fairly taut. With a spool of approximately five inches diameter, as much as 500 feet of line may be played out from the spool 29. When a fish seizes the bait and runs with the hook, the spring-tensioned spool 29 continues to wind up the slack in the line as the fisherman grasps it and pulls it toward him. In this manner, the spring wound reel of this invention automatically prevents snarls by constantly keeping the line in a taut condition.

While I have shown and described my invention in detail, it is to be understood that the same is to be limited only by the appended claims, for many changes may be made without departing from the spirit and scope of my invention.

What I claim is:

1. In a self-winding fishing reel, a support having a spring anchorage connected thereto, a shaft mounted in said support, a spool mounted for rotation around said shaft, a spring connected at one end to said spring anchorage, mechanism connecting the other end of said spring with said spool and responsive to the turning of said spool to wind up said spring, and a hub portion on said shaft having therein a notch with a sharply inclined abutment surface and a gradually inclined approach surface and a reversely-directed pawl separate from said spring and secured to the inner end of said spring said pawl being slidable along said approach surface into engagement with said abutment surface for anchoring the inner end of said spring to said hub portion in response to the winding of said spool in one direction and responsive to the winding of said spool in the opposite direction for releasing said spring end.

2. In a self-winding fishing reel, a support having a spring anchorage connected thereto, a shaft mounted in said support, a spool mounted for rotation around said shaft, a spring connected at one end to said spring anchorage, mechanism connecting the other end of said spring with said spool and responsive to the turning of said spool to wind up said spring, and a hub portion on said shaft having therein a notch with a sharply inclined abutment surface and a gradually inclined approach surface and a reversely-directed spring pawl separate from said spring and secured to the inner end of said spring said pawl being slidable along said approach surface into engagement with said abutment surface for anchoring the inner end of said spring to said hub portion in response to the winding of said spool in one direction and responsive to the winding of said spool in the opposite direction for releasing said spring end.

ALBERT SPORKET.

REFERENCES CITED

The following references are of record in the file of this patent:

UNITED STATES PATENTS

| Number | Name | Date |
|---|---|---|
| 367,657 | Jenkins | Jan. 17, 1888 |
| 602,585 | Moore | Apr. 19, 1898 |
| 681,864 | Wallace et al. | Sept. 3, 1901 |
| 742,586 | Carlton et al. | Oct. 27, 1903 |
| 815,143 | Carlton | Mar. 13, 1906 |
| 1,023,853 | Kadla | Apr. 23, 1912 |
| 1,182,261 | Foothorsp | May 9, 1916 |
| 1,944,264 | Oravec et al. | Jan. 23, 1934 |
| 2,006,482 | Russell et al. | July 2, 1935 |
| 2,164,654 | Kersting | July 4, 1939 |
| 2,417,941 | Loos | Mar. 25, 1947 |